United States Patent [19]
Kirkpatrick

[11] 3,980,319
[45] Sept. 14, 1976

[54] FOLDING STEP FOR HIGH GROUND CLEARANCE VEHICLES

[75] Inventor: Elwood L. Kirkpatrick, Portland, Oreg.

[73] Assignee: R and L Accessories, Inc., Portland, Oreg.

[22] Filed: July 23, 1975

[21] Appl. No.: 598,420

[52] U.S. Cl. .................................. 280/166; 182/89
[51] Int. Cl.² ........................................ B60R 3/02
[58] Field of Search ............... 280/166, 163, 164 R, 280/164 A; 182/89, 90, 91, 92

[56] References Cited
UNITED STATES PATENTS

| | | | |
|---|---|---|---|
| 2,492,068 | 12/1949 | Schofield et al. | 280/166 |
| 3,266,594 | 8/1966 | Antosh et al. | 280/166 X |
| 3,329,443 | 7/1967 | Lowder et al. | 280/166 |
| 3,758,134 | 9/1973 | Stewart | 280/163 |
| 3,762,742 | 10/1973 | Bucklen | 280/166 |

*Primary Examiner*—Kenneth H. Betts
*Assistant Examiner*—Michael J. Forman
*Attorney, Agent, or Firm*—Eugene M. Eckelman

[57] ABSTRACT

A supporting body member is arranged to be secured to a vehicle frame and has a downwardly angled flat wall portion on which one end of an arm carrying a step plate is pivotally attached. The axis of the pivot connection for the step arm extends at right angles to the downwardly angled wall portion so that when the arm is swung out to a use position the step plate is in a lowered position and when swung rearwardly to a non-use position the step plate is elevated. The body member has an upwardly directed front flange forming a stop for the step arm, and a detent is located on the flat wall portion behind the step arm to hold the latter in its use position, the arm being arranged, however, such that it can move rearward over the detent in the event that the arm or step plate is struck from the front or in the event that it is desired to retract the step manually. A tension spring is connected between the step arm and the body member and has over-center positions to assist in holding the step arm forward in its use position and to hold the step arm in a retracted non-use position. Another embodiment utilizes a friction washer to hold the step arm in use and non-use positions.

6 Claims, 4 Drawing Figures

FOLDING STEP FOR HIGH GROUND CLEARANCE VEHICLES

BACKGROUND OF THE INVENTION

This invention relates to new and useful improvements in folding steps for vehicles.

Many vehicles such as four-wheel drive pickups, campers, trailers and the like are very difficult to step into and descend from since the door sill is a considerable distance above the ground. Devices have been proposed before which provide a step to assist a person in stepping into the vehicle but such devices are complex in construction and do not provide the simplicity required for commercial success. Such devices also are rendered inoperative when covered with mud and road grime since they contain a considerable number of movable parts. Furthermore, since these step structures must be mounted under the vehicle, they are easily damaged, and even though some of them are retractable, they are often left in their use position by neglect of the operator and are damaged if struck by an object when the vehicle is moving.

SUMMARY OF THE INVENTION

According to the present invention, a primary objective of the present invention is to provide a folding step for vehicles that is simplified in structure and economical to manufacture, which is easily attached to a vehicle, which is rugged in its construction, and which is automatically retracted in the event that it is struck from the front.

To accomplish the above objective, the step has a body member arranged to be attached to a vehicle frame. This body member has downwardly angled means on which a step arm is pivotally attached. Due to the angled pivot connection of the step plate arm, a step on the outer end thereof is disposed in a lower plane in its use position and when retracted is elevated to a rearward out-of-the-way position. Means are provided to hold the step arm in its outwardly projecting use position but such means at the same time allows the step arm to be retracted in the event that it is struck from the front or in the event it is desired to retract the step manually.

The invention will be better understood and additional objects and advantages will become apparent from the following description taken in connection with the accompanying drawings which illustrate preferred forms of the device.

DETAILED DESCRIPTION OF PREFERRED EMBODIMENTS

Figure 1:
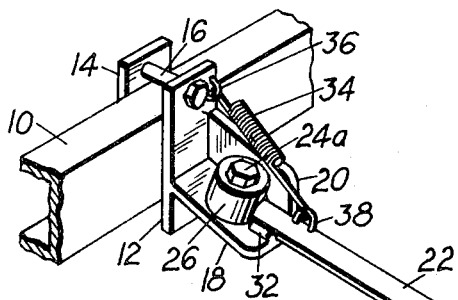
FIG. 1 is a perspective view of a first embodiment of the present step.

With reference first to FIG. 1, the numeral 10 designates a conventional frame portion of a vehicle. Such frame portion exists in substantially all vehicles such as pickup trucks, trailers, and the like, and usually extends longitudinally beneath the body and set in from the side thereof. The present step includes a body member 12 in the form of a mounting plate, and this plate is secured in upright position on the outside of the frame 10 by a clamp plate 14 disposed on the back side of the frame and bolted to body member 12 as by bolts 16.

Body member 12 integrally supports an outwardly projecting flat wall or floor portion 18 in a downwardly angled position, and such wall portion has an integral upstanding front flange 20. Wall portions 18 and 20 may simply comprise an angle iron suitably cut for welding to the upright body member 12 in an arrangement to extend in the downwardly angled disposition.

A step arm 22 has an inner end pivotally connected to the flat wall 18. The pivot connection comprises a bolt 24 extending through the wall portion 18 at substantially right angles thereto and through a bearing bushing 26 on the inner end of the arm 22. The pivot connection is disposed inwardly from the outer end of the wall portion 18 so that the latter provides a sturdy support for the arm 22, the pivot bolt 24 having a head 24a which is engageable against the top of the bushing 26 to provide good hold-down support of this end of the step arm in view of the leverage that is applied to such arm when supporting a person thereon.

The outer end of arm 22 is angled upwardly at 28, and the upwardly angled portion has a step plate 30 secured thereon, as by welding. The angle 28 is of selected degree such that in the use position of the step the plate 30 will be in a substantially horizontal plane.

A detent or projection 32 is provided on the wall portion 18 in a position to hold the arm 22 between it and the front flange 20. This detent however is only of minimum height whereby while it will hold the arm 22 in its use position under normal use, it will allow the arm 22 to ride over it in the event that the step or arm is struck from the front, such as when the vehicle has passed over an obstruction high enough to engage the step or arm, or in the event it is desired to manually retract the arm.

Figure 2:
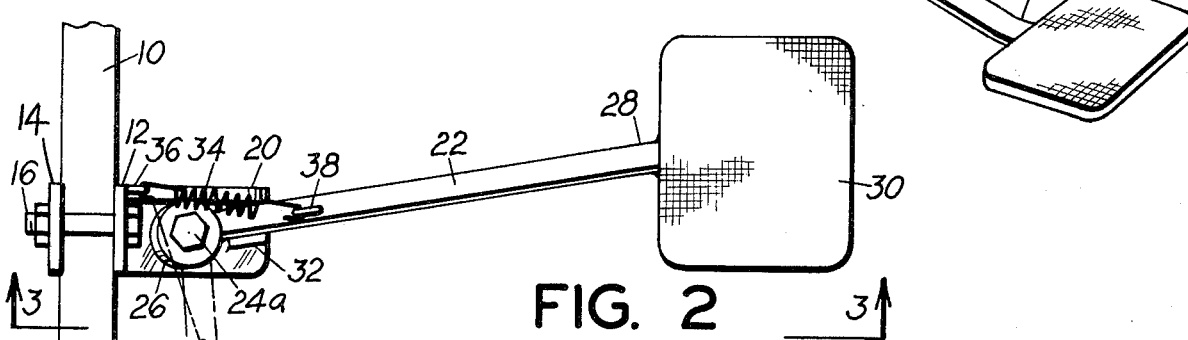
FIG. 2 is a top plan view thereof and showing in broken lines a retracted position of the step.
Figure 3:
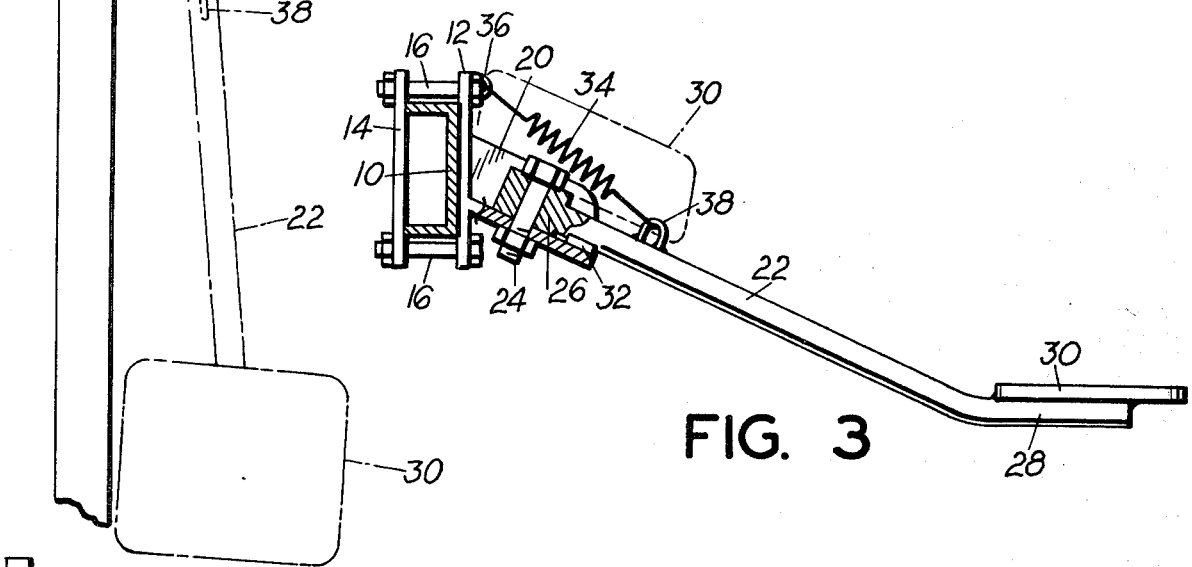
FIG. 3 is a side elevational view taken on the line 3—3 of FIG. 2, this view being partly broken away.

A tension spring 34 is connected between eyes 36 and 38 integral respectively with an upper portion body member 12 and step arm 22. The eye 36 is located forwardly on the body member 12 with relation to eye 38 and thus the spring assists in holding the step arm in its outwardly projecting use position. However, with reference to FIG. 2 and as shown in broken lines, the spring is moved to an over-center position with relation to the pivot point 24 when the step arm has been moved to its retracted position and thus it will also hold the step arm in said retracted postion.

As apparent hereinbefore, the step arm can be forcefully moved rearwardly over the detent 32 such as when struck from the front or when manually retracted, and the spring 34 assists in holding the step arm in its use position and fully holds the step arm in its retracted non-use position.

In the operation of the present step, it normally is disposed in its outwardly projecting position as seen in FIG. 1, and since the arm 22 is disposed in parallel relation to the wall 18, the step plate 30 in its outward position will be in a lower position with relation to the frame 10 of the vehicle for properly locating it. However, in the retracted position of the step arm, in view of the angular disposition of the pivot bolt 24, the step arm moves upwardly. When fully retracted rearwardly, it is in a plane as high as the frame 10 and will thus be in an out-of-the-way position on the vehicle.

Figure 4:
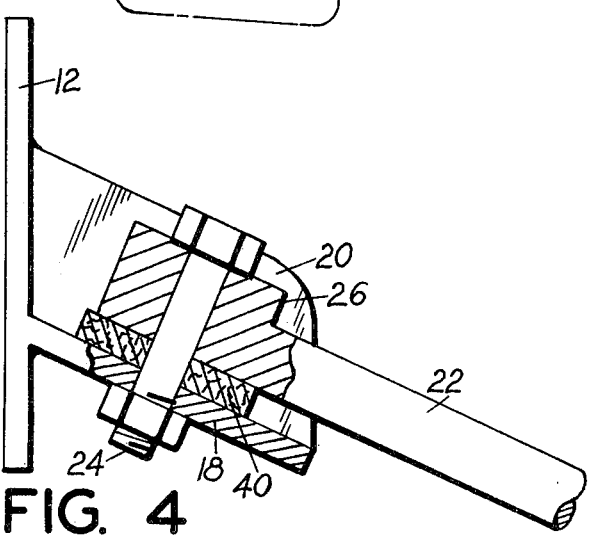
FIG. 4 is a fragmentary side elevational view taken similar to FIG. 3 but showing a modified form of the present step, this view also being partly broken away.

FIG. 4 shows a second form of the invention. Such embodiment is similar to that shown in FIG. 1 to the extent that it has the upright body member 12, the downwardly angled wall 18, flange 20, and the step arm 22 with the step plate. In this embodiment, however, the detent 32 and spring 34 are omitted and a friction washer 40 is disposed between the bottom of bushing 26 of the step arm and the wall 18. The pivot bolt 24 is used as in FIG. 1 but is clamped down sufficiently tight against the friction washer 40 such that the arm 22 will be held wherever located. Thus, the arm can be manually moved to its lower use position or it can be manually retracted, or of course it will automatically retract and elevate in the event that the step or arm is struck from the front.

In accordance with the present invention, a simplified folding step structure is provided which due to its simplification is economical to manufacture and easy to apply to the vehicle. In addition, the step is rugged in construction and will readily swing out of the way when struck from the front so as not to be damaged.

It is to be understood that the forms of my invention herein shown and described are to be taken as preferred examples of the same and that various other changes in the shape, size and arrangement of parts may be resorted to without departing from the spirit of my invention or the scope of the subjoined claims.

Having thus described my invention, I claim:

1. A step structure for high ground clearance vehicles having a bottom frame, said step comprising,
    a. a body member,
    b. means on said body member arranged to secure it to a vehicle frame,
    c. said body member having a downwardly angled laterally extending flat wall portion,
    d. an arm having inner and outer ends,
    e. a step plate supported on the outer end of said arm,
    f. means pivotally supporting said arm adjacent its inner end on said downwardly angled laterally extending portion,
    g. said pivot means having it axis extending at substantially right angles to said downwardly angled laterally extending flat wall portion whereby said arm in a pivoted position extending laterally outwardly positions said step plate in a use position lower than said pivot means and in a pivoted position extending rearwardly positions itself and said step plate in a non-use position in a plane higher than said use position so as to be out of the way.
    h. and holding means maintaining said arm in the outward use position of said step plate but allowing ready releasable movement of the arm from said use position to permit the arm to swing rearwardly in the event it or the step plate is struck from the front.

2. The step structure of claim 1 wherein said holding means includes a tension spring connected between said arm and said body member and holding said arm in its outwardly projecting position.

3. The step structure of claim 1 wherein said holding means includes an over-center spring connected between said arm and said body and serving in one position to hold said arm in its outwardly projecting position and in its other position to hold said arm in its rearward position.

4. The structure of claim 1 including friction means at said pivot connection arranged to maintain said arm in its outwardly projecting use position or a rearwardly directed non-use position.

5. The step structure of claim 1 including an upright wall portion on said downwardly angled laterally extending flat wall portion limiting forward pivoting movement of said arm to its outwardly projecting position, and a detent on said downwardly angled laterally extending flat wall portion disposed on the rear side of said arm for retaining said arm in its outwardly projecting position adjacent said upright wall portion.

6. The step structure of claim 5 wherein said detent is arranged to allow said arm to slide frictionally over it whereby said arm can pivot rearwardly in the event the arm or step plate is struck from the front.

* * * * *